(12) United States Patent
Braunheim et al.

(10) Patent No.: US 9,494,114 B2
(45) Date of Patent: Nov. 15, 2016

(54) WATER DISCHARGE DEVICE

(75) Inventors: Michael Braunheim, Geoppingen (DE); Kerstin Flaggl, St. Stefan (AT); Markus Fontano, Wolfsberg (AT); Werner Schadler, Seggauberg (AT)

(73) Assignee: Mahle International GmbH (DE)

( * ) Notice: Subject to any disclaimer, the term of this patent is extended or adjusted under 35 U.S.C. 154(b) by 691 days.

(21) Appl. No.: 13/698,995

(22) PCT Filed: May 18, 2011

(86) PCT No.: PCT/EP2011/058034
§ 371 (c)(1),
(2), (4) Date: Jul. 22, 2013

(87) PCT Pub. No.: WO2011/144654
PCT Pub. Date: Nov. 24, 2011

(65) Prior Publication Data
US 2014/0007949 A1    Jan. 9, 2014

(30) Foreign Application Priority Data

May 20, 2010    (DE) .................. 10 2010 022 195

(51) Int. Cl.
*F02M 37/12*    (2006.01)
*F02M 37/00*    (2006.01)
*B60K 15/01*    (2006.01)
*B60K 15/03*    (2006.01)
*F02M 37/22*    (2006.01)

(52) U.S. Cl.
CPC .......... *F02M 37/0082* (2013.01); *B60K 15/01* (2013.01); *B60K 15/03* (2013.01); *F02M 37/221* (2013.01); *B60K 2015/0321* (2013.01); *Y10T 137/7313* (2015.04)

(58) Field of Classification Search
CPC .......... F02M 37/0082; F02M 37/221; B60K 15/01; B60K 15/03; B60K 2015/0321; Y10T 137/7313
USPC ......... 137/203, 574; 73/290 R, 304 R, 304 C
See application file for complete search history.

(56) References Cited

U.S. PATENT DOCUMENTS

| 6,540,926 | B2 * | 4/2003 | Goodrich ........... B01D 17/0208 210/305 |
| 6,645,372 | B2 * | 11/2003 | Girondi .......................... 210/85 |
| 2006/0207924 | A1 * | 9/2006 | De La Azuela et al. ..... 210/248 |
| 2011/0186501 | A1 | 8/2011 | Braunheim et al. |

FOREIGN PATENT DOCUMENTS

| DE | 102008034904 A1 | 1/2010 |
| WO | WO-2004/051070 A1 | 6/2004 |
| WO | WO-2004/061289 A1 | 7/2004 |

* cited by examiner

*Primary Examiner* — Kevin Murphy
*Assistant Examiner* — Nicole Wentlandt
(74) *Attorney, Agent, or Firm* — Fishman Stewart PLLC

(57) ABSTRACT

A water discharge device may include a water collection chamber including a water drainage valve. At least one water sensor may be arranged in a region of the water collection chamber for determining a water level in the water collection chamber and for controlling the water drainage valve. A device may be configured to maintain the water sensor in contact with the water by keeping a water level artificially high in the region of the water collection chamber at the water sensor.

20 Claims, 1 Drawing Sheet

WATER DISCHARGE DEVICE

CROSS-REFERENCE TO RELATED APPLICATIONS

This application claims priority to German Patent Application 10 2010 022 195.3, filed on May 20, 2010, and International Patent Application PCT/EP2011/058034, filed on May 18, 2011, both of which are hereby incorporated by reference in their entirety.

TECHNICAL FIELD

The present invention relates to a water discharge device, in particular in a fuel tank or in a filtration device. The invention also relates to a filtration device having such a water discharge device.

BACKGROUND

Fuel for internal combustion engines is usually filtered first before it is fed to the actual combustion process. The water contained in the fuel can damage the internal combustion engine itself or parts thereof, such as an injection system, for example by oxidation of metal parts, for which reason fuel filters are usually used, which are intended to filter out the highest possible proportion of the water contained in the fuel. In known fuel filters, a water collection chamber is arranged in the lower region, in which chamber the water collects owing to its higher specific density compared to fuel. At predefined times, or when predefined levels are reached, the water collection chamber is emptied and the water situated therein is drained. The disadvantage of known fuel filters is however that contamination of the environment with fuel can occur if a water discharge device for draining the water from the water collection chamber incorrectly detects a water level.

SUMMARY

The present invention is concerned with the problem of creating a water discharge device which in particular reduces the risk of contamination of the environment with hazardous substances such as fuel.

This problem is solved according to the invention by the subject matter of the independent claims. Advantageous embodiments of the invention are the subject of the dependent claims.

The present invention is based on the general concept of, in a water discharge device having a water collection chamber and at least one water sensor for determining a water level in the said water collection chamber, arranging at least one water sensor in the water collection chamber in such a manner that it only comes into contact with water, i.e. in particular never with fuel or oil, under normal operating conditions. The at least one water sensor is arranged according to the invention in a bottom region of the water collection chamber, a device also being provided which keeps a water level artificially high in the region of the at least one water sensor and thereby ensures that the water sensor comes into contact with water under normal operating conditions, for example also during cornering or tilted positions up to 45°. The device according to the invention thus ensures that the water sensor is in contact with water in all operating states and thus in particular prevents malfunctions which [result in] an unintentional and undesirable drainage of oil or fuel. Such a device can for example be formed as a bottom sink in which the at least one water sensor is arranged. Then, what is known as a subvolume is provided in the bottom sink, which subvolume is only filled with water, as a result of which it can be ensured that the at least one water sensor is always in contact with water. A corresponding water drain is arranged on a bottom of the bottom sink. The water collected in the water collection chamber is drained at predefined time intervals and is stopped immediately if the at least one water sensor loses contact with water. Owing to the water which is still present in the bottom sink, however, a residual volume is always ensured in the water collection chamber, so it can reliably be ruled out that fuel or oil is inadvertently drained and contaminates the environment. In this connection, fuel or oil is often mentioned, so the water discharge device according to the invention can be arranged for example in a fuel tank or in a filtration device. Arrangement in any other apparatus, in which a heavy first fluid collects at the bottom, which fluid should be separated by drainage from a second fluid lying above it, is however of course also conceivable. Alternatively to the just proposed device, it can also be formed as a wall contour which at least partially surrounds the at least one water sensor, the said wall contour likewise ensuring that the water sensor stays in contact with the water or the first fluid to be separated out in all conceivable operating states. During driving off road, the wall contour also serves as splash protection to prevent ingress of fuel/diesel into a drainage line through the subvolume. When the liquid level is calm, the risk only exists if a tilted position of 45° is exceeded. During driving, however, the dynamics of all the liquid when there is no wall contour can result in flooding of the drainage line with diesel.

In an advantageous development of the solution according to the invention, the water sensor is configured to switch a valve device, by means of which water can be drained if required. The valve device is for example formed as an electric drainage valve and is opened either at certain time intervals or by the signal of a second water sensor. The valve device is closed immediately if the at least one water sensor begins to lose contact with the water collected in the water collection chamber. A loss of this contact indicates a reduction in the water level in the water collection chamber to below a predefined, in particular critical, limit value.

Further important features and advantages of the invention result from the sub-claims, from the drawings and from the associated description of the figures on the basis of the drawings.

It is to be understood that the previously mentioned features and the features which are still to be mentioned in the following, can be used not only in the respectively specified combination, but also in other combinations or alone, without departing from the context of the present invention.

Preferred exemplary embodiments of the invention are illustrated in the drawings and are described in more detail in the description below, identical reference numbers referring to identical or similar or functionally identical components.

BRIEF DESCRIPTION OF THE DRAWINGS

In the figures.

DETAILED DESCRIPTION

Figure 1:
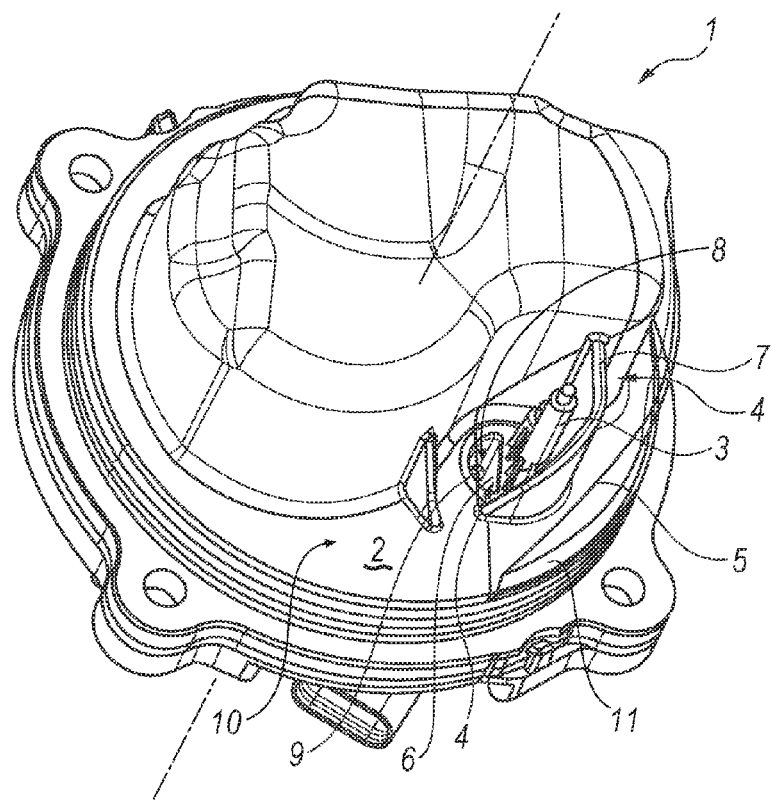
FIG. 1 schematically shows a water discharge device according to the invention in an oblique view, FIG. 2 schematically shows a diagram as in FIG. 1, but with an imaginary water level drawn in as if the water discharge device were tilted.
Figure 2:
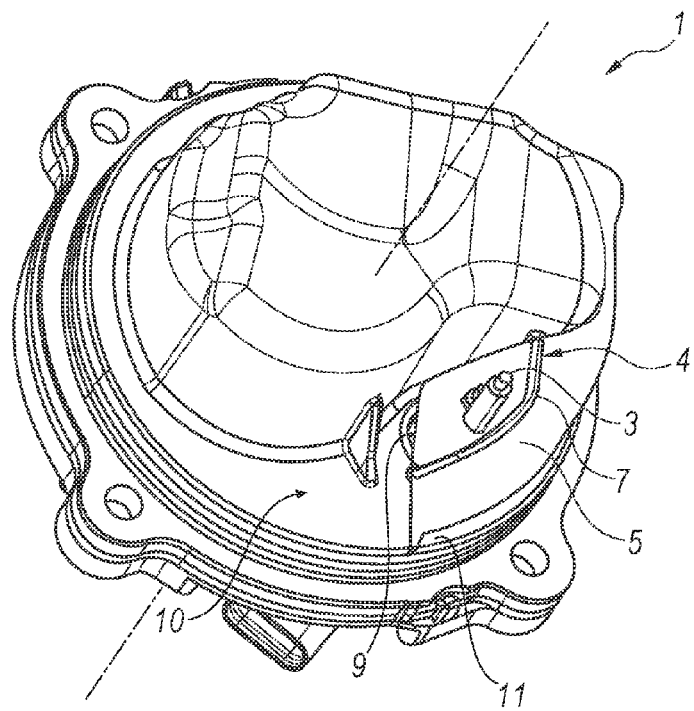

According to FIGS. 1 and 2, a water discharge device 1 according to the invention, which can be arranged in particular in a fuel tank or in a filtration device generally shown at 11, has a water collection chamber 2 and at least one water sensor 3 for determining a water level 5 in the water collection chamber 2 and for controlling a water drainage valve. The at least one water sensor 3 is arranged in the bottom 10 of the water collection chamber 2, above the water drainage valve 8 or a water drain 9, a device 4 being provided which keeps a water level artificially high in the region of the at least one water sensor 3 and thereby ensures that the water sensor 3 remains in contact with the water to be drained under all conceivable operating conditions.

The device 4 can according to the invention be formed as a bottom sink 6 in which the at least one water sensor 3 is arranged. In addition or alternatively, the device 4 according to the invention can also be formed as a wall contour 7 which at least partially surrounds the at least one water sensor 3, it being ensured independently of the configuration of the device 4 that the water level 5 in the water collection chamber 2 and in particular around the water sensor 3 does not fall below a predefined, undesirable limit value. During driving off road, the said wall contour 7 also serves as splash protection to prevent ingress of fuel into a drainage line through the subvolume. When the liquid level is calm, the risk only exists if a tilted position of 45° is exceeded. During driving, however, the dynamics of all the liquid if there is no wall contour 7 can result in flooding of the drainage line with fuel, which can lead to undesirable contamination of the environment.

The at least one water sensor 3 can be configured to switch the water drainage valve 8 (not shown in detail) by means of which water can be drained out of the water collection chamber 2 if required. It is also conceivable for a further, likewise not shown water sensor to be provided, which is situated above the at least one water sensor 3 and is configured to open the water drainage valve 8 if it detects water. The drainage process is continued until the water sensor 3 arranged in the bottom 10 of the water collection chamber 2 begins to lose contact with the water. Owing to the water volume being kept artificially high around the water sensor 3, it can reliably be ensured that, when the at least one water drainage valve 8 is closed, no more fluid, in particular no fuel or oil, is drained as well, thereby making contamination of the environment likely. The drainage line, in which the at least one water drainage valve 8 is arranged, is arranged below the at least one water sensor 3.

The valve device 8 can for example be opened electrically, but closed mechanically, in particular by means of a spring, as a result of which what is known as a fail-safe principle can be realised, which ensures that unintended drainage and thus contamination of the environment can be reliably avoided, in particular in the case of a power failure. The water discharge device 1 also ensures reliable detection of the water level 5 during cornering or tilting of a vehicle if the water discharge device 1 according to the invention is arranged for example in a fuel filter or fuel tank 11 of the vehicle.

Generally, a water collection chamber 2 and a water discharge device 1 is mentioned in both the claims and the description, it being of course clear that this restriction only represents one possible field of use, so the water discharge device 1 according to the invention can generally also be used for separating a first, heavy fluid from a second, comparatively lighter fluid. The main field of use for the water discharge device 1 according to the invention is however a fuel filter or an oil filter or a fuel tank 11 in a motor vehicle. The device 4 according to the invention can be formed in a cost-effective manner, regardless of whether it is a sink 6 or a wall contour 7, so the significant advantages of the invention can be achieved at comparatively low cost. The sink 6 or the wall contour 7, i.e. the device 4, can in particular be produced together with the water collection chamber 2, for example using a plastic injection moulding method.

The invention claimed is:

1. A water discharge device comprising:
   a water collection chamber configured to hold a fluid, the water collection chamber having an axis and defining a bottom surrounded by a periphery, the water collection chamber including a water drainage valve configured to discharge water,
   at least one water sensor for determining a water level in the water collection chamber and for controlling the water drainage valve, wherein the at least one water sensor is arranged in the water collection chamber a predefined axial extent from the bottom with respect to the axis and upstream the water drainage valve, and
   a device configured to maintain the at least one water sensor in contact with the water by keeping the water level artificially high in a region of the at least one water sensor, wherein the device includes a wall contour at least partially surrounding the at least one water sensor and projecting axially from the bottom of the water collection chamber with respect to the axis, and wherein the wall contour is arranged at least partially radially spaced from the periphery by an extent configured to receive a volume of fluid.

2. The water discharge device according to claim 1, wherein the device further includes a bottom sink from which the at least one water sensor axially projects, and wherein the bottom sink is disposed in the bottom of the water collection chamber.

3. The water discharge device according to claim 2, wherein the bottom sink is configured axially depressed from the bottom of the water collection chamber with respect to the axis and includes a subvolume, and wherein the at least one water sensor is arranged in the subvolume so that no fuel passes into the water drainage valve.

4. The water discharge device according to claim 1, wherein the wall contour is arranged apart from the at least one water sensor and projects axially from the bottom of the water collection chamber an extent corresponding to at least part of the predefined axial extent of the at least one water sensor.

5. The water discharge device according to claim 1, wherein the at least one water sensor is configured to open the valve to drain the water.

6. The water discharge device according to claim 5, wherein the valve is opened electrically and closed mechanically.

7. The water discharge device according to claim 1, wherein the at least one water sensor is arranged radially bordering the water drainage valve and axially extended from the bottom of the water collection chamber with respect to the axis, and wherein the wall contour is disposed radially between the at least one water sensor and the periphery of the water collection chamber to protect against splashing.

8. The water discharge device according to claim 1, wherein the bottom of the water collection chamber defines an area disposed radially between the wall contour and the periphery for receiving the volume of fluid.

9. A filtration device, comprising:
an enclosure; and
a water discharge device having an axis and including:
a water collection chamber defining a bottom disposed coaxially to the axis of the water discharge device and surrounded by the enclosure when the water discharge device is coupled to the enclosure, the water collection chamber including a water drainage valve for discharging water,
at least one water sensor for determining a water level in the water collection chamber and for controlling the water drainage valve, wherein the at least one water sensor is arranged in the water collection chamber upstream of the water drainage valve and defines an axial extent from the bottom with respect to the axis, and
a device configured to maintain the at least one water sensor in contact with the water by keeping the water level artificially high in a region of the at least one water sensor,
wherein the device includes a wall contour disposed in the water collection chamber and at least partially surrounding the at least one water sensor, wherein the wall contour projects axially from the bottom and is arranged radially spaced from the enclosure with respect to the axis when the water collection device is coupled to the enclosure.

10. The filtration device according to claim 9, wherein the device further includes a bottom sink and the at least one water sensor is arranged in the bottom sink, and wherein the bottom sink is disposed in the bottom of the water collection chamber.

11. The filtration device according to claim 10, wherein the bottom sink is configured axially depressed from the bottom of the water collection chamber with respect to the axis and includes a subvolume, and wherein the at least one water sensor is arranged in the subvolume so that no fuel passes into the water drainage valve.

12. The filtration device according to claim 9, wherein the wall contour is arranged apart from the at least one water sensor and projects axially from the bottom an extent corresponding to at least partially the axial extent defined by the at least one water sensor.

13. The filtration device according to claim 9, wherein the at least one water sensor is configured to open the valve to drain the water.

14. The filtration device according to claim 13, wherein the valve is opened electrically and closed mechanically.

15. The filtration device according to claim 9, wherein the wall contour is arranged spaced from a radial periphery of the bottom to define an area for receiving a volume of water between the wall contour and the periphery.

16. The filtration device according to claim 15, wherein the wall contour is disposed radially between the at least one water sensor and the enclosure when the water collection device and the enclosure are coupled together to protect against splashing.

17. A water discharge device, comprising:
a water collection chamber having an axis and defining a bottom arranged coaxially with the axis and surrounded by a periphery, the bottom including a drain for discharging a fluid;
at least one sensor disposed in the water collection chamber upstream of the drain for determining a fluid level in the water collection chamber, wherein the at least one sensor is arranged at the drain and defines an axial extent from the bottom with respect to the axis; and
a device configured to maintain an artificially high fluid level in a region of the at least one sensor, wherein the device includes a wall contour at least partially surrounding the drain and the at least one sensor, the wall contour arranged radially apart from the periphery by a space configured to receive a volume of the fluid radially between the wall contour and the periphery, and wherein the wall contour projects axially from the bottom an extent corresponding to at least part of the axial extent defined by the at least one sensor.

18. The water discharge device according to claim 17, wherein the device further includes a bottom sink disposed in the bottom of the water collection chamber, wherein the bottom sink is configured axially depressed from the bottom and extends into the drain, and wherein the at least one sensor extends axially from the bottom sink with respect to the axis.

19. The water discharge device according to claim 17, wherein the drain includes a drainage valve, and wherein the at least one sensor is configured to open and close the drainage valve.

20. The water discharge device according to claim 17, wherein the bottom of the water collection chamber has an area disposed radially between the wall contour and the periphery for receiving the volume of fluid.

\* \* \* \* \*